United States Patent [19]
Williams

[11] Patent Number: 5,834,854
[45] Date of Patent: *Nov. 10, 1998

[54] MOTOR VEHICLE ELECTRICAL SYSTEM

[75] Inventor: Trevor Williams, Ann Arbor, Mich.

[73] Assignee: Ford Motor Company, Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 531,879

[22] Filed: Sep. 21, 1995

[51] Int. Cl.$^6$ ................................................ G08B 25/00
[52] U.S. Cl. .................... 307/10.6; 307/10.1; 307/10.7; 180/65.1
[58] Field of Search ................................. 307/9.1–10.8, 307/110, 17; 363/62; 323/359; 180/65.1, 65.2

[56] References Cited

U.S. PATENT DOCUMENTS

| | | | |
|---|---|---|---|
| 3,792,341 | 2/1974 | Kime, Jr. ................................. | 323/285 |
| 4,230,970 | 10/1980 | Potter et al. ............................ | 315/307 |
| 4,237,405 | 12/1980 | Kellis ...................................... | 315/307 |
| 4,950,972 | 8/1990 | Berg ........................................ | 322/8 |
| 4,965,550 | 10/1990 | Wroblewski ............................ | 340/424 |
| 5,053,677 | 10/1991 | Sanner et al. ............................ | 315/77 |
| 5,128,551 | 7/1992 | Clokie ..................................... | 307/10.1 |
| 5,173,653 | 12/1992 | Hochstein ................................ | 320/13 |
| 5,349,747 | 9/1994 | Dennis .................................... | 307/10.1 |
| 5,375,051 | 12/1994 | Decker et al. ........................... | 363/49 |
| 5,386,359 | 1/1995 | Nochi ...................................... | 363/21 |
| 5,396,410 | 3/1995 | Okochi et al. ........................... | 363/21 |
| 5,402,059 | 3/1995 | Bittar ....................................... | 323/223 |

*Primary Examiner*—Jeffrey A. Gaffin
*Assistant Examiner*—Peter Ganjian
*Attorney, Agent, or Firm*—Mark S. Sparschu

[57] ABSTRACT

In one embodiment of the present invention, a motor vehicle electrical system has a plurality of electronic modules. The electrical power input of each module is coupled to the output of a switching power supply. Further, the electrical power input of each module is switchably coupled to vehicle system voltage. During "key-on", the switchable connection to vehicle system voltage is closed, thereby providing "key-on" power for the modules from system voltage. During "key-off", the switchable connection is opened, thereby providing "key-off" power for the modules from the switching power supply. In a second embodiment of the present invention, a motor vehicle electrical system has at least one electronic module with a normal power input and a "key-off" power input. The normal power input is coupled to vehicle system voltage, and the "key-off" power input is coupled to the output of a switching power supply. Systems embodying the present invention can reduce "key-off" current draw from the vehicle battery.

13 Claims, 1 Drawing Sheet

MOTOR VEHICLE ELECTRICAL SYSTEM

BACKGROUND OF THE INVENTION

1. Field of the Invention

The present invention relates to motor vehicle electrical systems.

2. Description of the Related Art

The size of a motor vehicle's battery is dependent in large part upon the amount of "key-off" current the battery must provide. "Key-off" current must be provided completely from the battery. By contrast, current consumed while the vehicle is running is provided by the vehicle's alternator. The larger a vehicle's "key-off" current, the larger the battery must be in order to provide reasonable storage times after which the vehicle can still be started.

Electronic modules are major consumers of "key-off" current. Electronic modules have some functions, such as electronic clocks, which continue their normal operation despite the vehicle's having been turned off. Another such key-off function a occurs in remote keyless entry modules, where an oscillator runs all the time (including during key off) to sense for a remote entry radio-frequency signal from a key fob. Yet another key-off function occurs in vehicle security systems, where a microprocessor in the system may "wake up" periodically, or may run continually in a low-power state, to monitor the various intrusion and theft sensors on the vehicle. Further, keep-alive random-access memory (RAM) in electronic modules must remain powered, at least periodically, during key-off to retain its data.

One way to reduce drain on a vehicle's battery due to "key-off" currents is to disconnect power to various "key-off" electrical loads after a certain period of vehicle inactivity. Hopefully, with the loads so disconnected, enough battery power will be preserved to start the vehicle. However, if such a method is applied to, e.g., keep-alive memory, the contents of the memory will be lost. Further, if such a disconnection method is applied to an electronic clock, the clock will lose track of time. Although the vehicle will have sufficient power to start, functionality of the electronic devices which have been disconnected will have been disrupted.

Thus, a system which reduces key-off current draw will provide advantages over alternative systems. Specifically, the vehicle's battery can be reduced in size. Also, to the extent that the drastic step of disconnecting key-off loads can be forborne for at least some period of time, functionality of the vehicle will be improved.

SUMMARY OF THE INVENTION

The present system provides an electrical system for a motor vehicle. The electrical system comprises a plurality of electronic devices each having a power source input. Also, the electrical system includes an energy storage device having a power output and a power source with a power output. Further, the electrical system comprises a switching power supply having a power input and a power output, the power input coupled to said power output of the energy storage device and the power output coupled to the power source inputs of the electronic devices. Additionally, the electrical system has switching means for switchably coupling the power output of the power source to the power source inputs of the electronic devices.

The present invention also provides a second electrical system for a motor vehicle. This electrical system comprises a switching power supply having a power input and a power output. In addition, the electrical system includes an energy storage device with a power output coupled to the power input of the switching power supply. Further, the electrical system has a power source with a power output. Also, the electrical system comprises a plurality of electronic devices each further comprising a normal-operation power input and a key-off power input, wherein the normal-operation power inputs of the electronic devices are coupled to the power output of the power source, and wherein the key-off power inputs of the electronic devices are coupled to the power output of the switching power supply.

Systems embodying the present invention can reduce the "key-off" current draw from the battery of a motor vehicle. In doing so, such systems provide advantages over the prior art.

DETAILED DESCRIPTION OF THE PREFERRED EMBODIMENT

Figure 1:
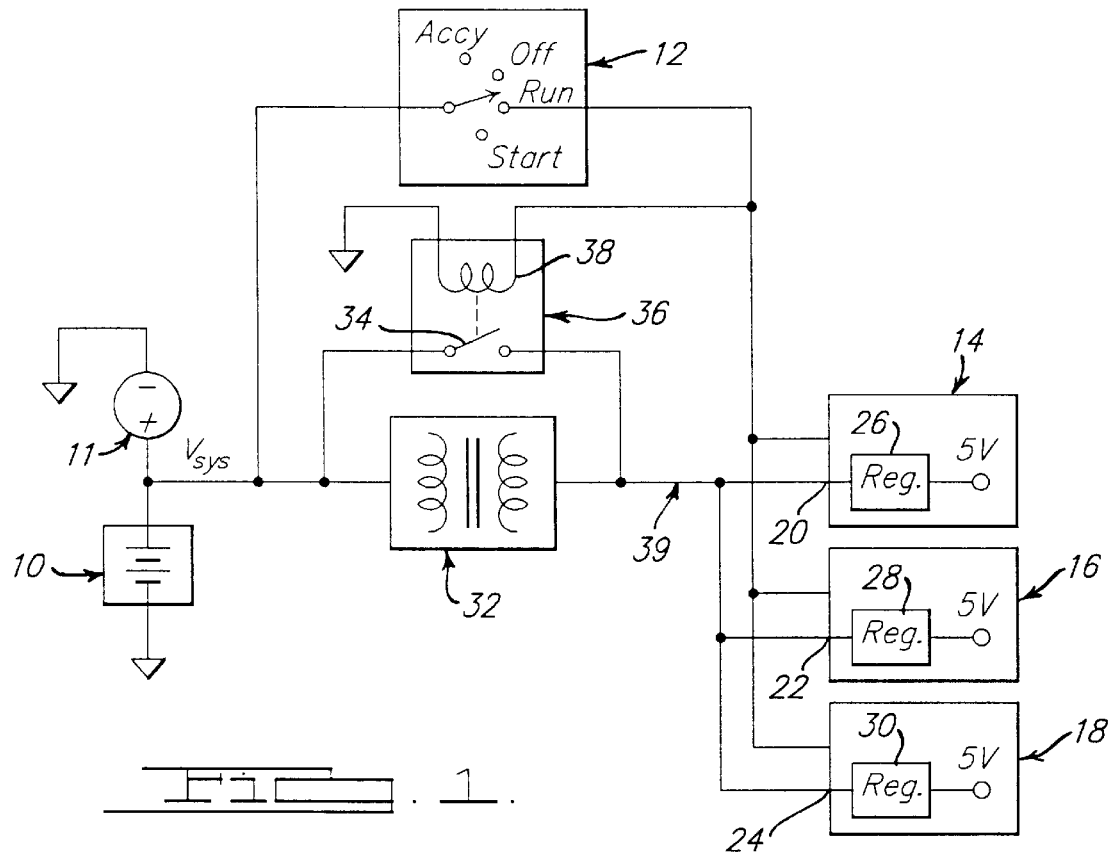
FIG. 1 is a diagram of a system according to one embodiment of the present invention.

Referring to FIG. 1, an electrical system according to one embodiment of the present invention will be described. The system includes a battery 10, preferably a 12-volt automotive battery. Coupled to battery 10 is an alternator 11. Vehicle system voltage $V_{sys}$ is provided by alternator 11 when the vehicle's engine is running. Otherwise, $V_{sys}$ is provided by battery 10.

Also coupled to battery 10 is an ignition switch 12. Coupled to ignition switch 12 are electronic modules 14, 16 and 18. As the system of FIG. 1 is configured, modules 14, 16 and 18 are intended to be turned on (that is, intended to begin full functionality) when ignition switch 12 is in the RUN position. As examples of other possible alternatives, modules 14, 16 and 18 can be connected to be turned on when ignition switch 12 is in the ACCY ("ACCESSORY") position, or when ignition switch 12 is in either RUN or ACCY. Some modules may even be connected to be powered when ignition switch 12 is in the START position.

As is common, electronic modules 14, 16 and 18 use the signal from ignition switch 12 as a logical input only. Power for modules 14, 16 and 18 is supplied from separate power supply inputs 20, 22 and 24. In conventional vehicle electrical systems, power supply inputs 20, 22 and 24 are connected directly to vehicle system voltage $V_{sys}$. Coupled to power supply inputs 20, 22 and 24 are linear voltage regulators 26, 28 and 30, respectively. These regulators provide, typically, five volts for the operation of electronic modules 14, 16 and 18. Five volts is a typical voltage for operating electronics, especially digital electronics.

Electronic modules 14, 16 and 18 also have other inputs and outputs to support the specific functions performed by each of the modules. Those other inputs and outputs are not shown in FIG. 1.

Coupled to battery 10 is a switching power supply 32. Switching power supply 32 can be designed according to several designs well-known to the art. In this embodiment of the present invention, switching power supply 32 is designed to provide an output of about seven volts DC. Coupled across switching power supply 32 is contact 34 of relay 36. The coil 38 of relay 36 is coupled to ignition switch 12. Of course, other types of switches (for example, solid state switches) can be used as appropriate in place of relay 36.

In the system of FIG. 1, when ignition switch 12 is on, contact 34 of relay 36 is closed. Battery 10 and alternator 11 are thus directly connected to electronic modules 14, 16 and 18. Because circuit 39 is at 12 volts—above the seven-volt regulation point of switching power supply 32—switching power supply 32 does not attempt to provide output power.

When ignition switch 12 is off, the power demands of modules 14, 16 and 18 are generally reduced. Typically, only minimal "key-off" functions are performed, such as an electronic clock keeping time, a security system monitoring its inputs, or keep-alive memory drawing minimal power to retain its data. When ignition switch 12 is off, contact 34 of relay 36 opens. In this case, instead of circuit 39 going to zero volts, switching power supply 32 regulates circuit 39 at the seven-volt output of switching power supply 32. There is thus still power to operate five-volt regulators 26, 28 and 30.

To minimize the cost and size of switching power supply 32, switching power supply 32 is preferably designed to provide only that power needed by electronic modules 14, 16 and 18 to perform their "key-off" functions.

The system of FIG. 1 thus reduces the current draw from battery 10 when the system is in "key-off" mode. Instead of linear voltage regulators 26, 28 and 30 being powered by 12 volts and dropping that 12-volt supply all the way down to five volts, switching power supply 32 drops the 12 volts down to seven volts. Linear voltage regulators 26, 28 and 30 are only called upon to convert the seven volts down to five volts. Those skilled in the art will recognize that, since switching power supplies convert voltages at higher efficiency than linear voltage regulators, the system of FIG. 1 will result in reduced "key-off" current draw from battery 10, when compared to conventional motor vehicle electrical systems.

Figure 2:
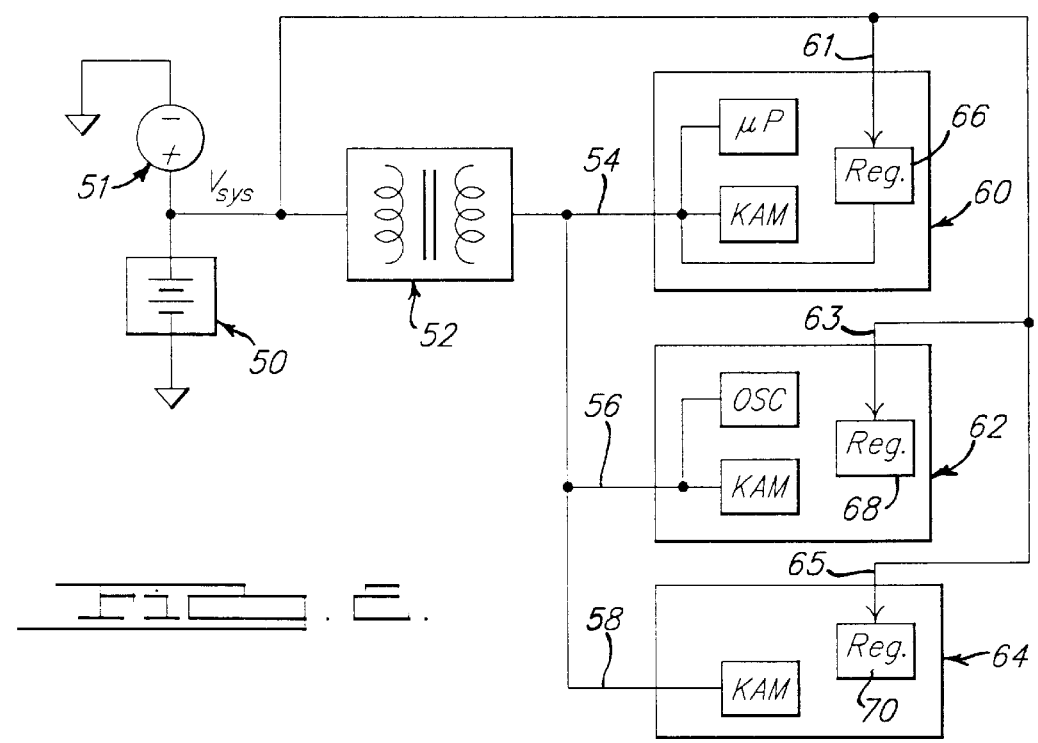
FIG. 2 is a diagram of a system according to a second embodiment of the present invention.

Referring to FIG. 2, a system according to another embodiment of the present invention is illustrated. Here, battery 50 is coupled at its output to switching power supply 52. Also coupled to battery 50 is alternator 51, provided to charge battery 50. Battery 50 is preferably a typical 12-volt automotive battery and switching power supply 52 preferably provides an output of five volts DC.

The output of switching power supply 52 is coupled to keep-alive power inputs 54, 56 and 58 of electronic modules 60, 62 and 64. Electronic modules 60, 62 and 64 are microprocessor-based devices. Keep-alive power inputs 54, 56 and 58 are coupled internally to "key-off" loads within modules 60, 62 and 64. For example, in module 60 keep-alive power input 54 is coupled to microprocessor μP, to provide power if microprocessor μP enters a low-power mode upon key-off. In module 60, keep-alive input 54 is also coupled to keep-alive RAM memory KAM. Note that in module 60, linear regulator 66 is also coupled to microprocessor μP, in order to provide power to microprocessor μP when in full-power mode.

As another example, in module 62 keep-alive power input 56 is coupled to oscillator OSC (for example, an oscillator used to detect a remote entry radio-frequency signal) and to keep-alive RAM KAM. As a further example, in module 64 keep-alive power input 58 is coupled only to keep-alive RAM KAM.

Electronic modules 60, 62 and 64 also each have a system voltage input 61, 63 or 65, respectively. This input provides power for all "key-on" uses within electronic modules 60, 62 and 64. The system voltage inputs 61, 63 and 65 of modules 60, 62 and 64 are coupled to five-volt linear regulators 66, 68 and 70, respectively.

Linear regulator 61 is preferably one which can be shut off by microprocessor μP in module 60 based on logic such as the ignition switch (not shown in FIG. 2) being turned off. "Key off" current for microprocessor μP and keep-alive memory KAM in module 60 will then come only from switching power supply 52.

Electronic modules 60, 62 and 64 also have other inputs and outputs to support the specific functions performed by each of the modules. Those other inputs and outputs are not shown in FIG. 2.

In this system, then, "key-on" power for modules 60, 62 and 64 is provided via the system voltage inputs 61, 63 and 65 of the modules. "Key-off" power, typically less than "key-on" power, is provided from switching power supply 52. The "key-off" current draw from battery 50 is reduced, because instead of "key-off" power being provided by linear regulators 66, 68 and 70 within modules 60, 62 and 64, the "key-off" power is provided by switching power supply 52. Those skilled in the art will recognize that conversion from 12 volts to five volts will be more efficiently performed by a switching power supply than by a linear voltage regulator.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. An electrical system for a motor vehicle comprising:

a plurality of electronic devices each having a power source input;

an energy storage device having a power output;

a power source with a power output;

a switching power supply having a power input and a power output, said power input coupled to said power output of said energy storage device and said power output coupled to said power source inputs of said electronic devices;

switching means for switchably coupling said power output of said power source to said power source inputs of said electronic devices; and an ignition switch; wherein said switching means is responsively coupled to said ignition switch;

each said electronic device has a first state having a first current draw and a second state of higher current draw than said first state; and said switching power supply has at least enough power output capability to provide sufficient power to all of said electrical devices when in their first states.

2. An electrical system as recited in claim 1, wherein:

said electronic devices each contain a linear voltage regulator having a minimum voltage input requirement; and said switching power supply has a voltage output greater than the voltage input requirements of said linear voltage regulators.

3. An electrical system as recited in claim 2, wherein said switching power supply has power output capability below that necessary to provide sufficient power to all of said electrical devices when in their said second states.

4. An electrical system as recited in claim 3, wherein said energy storage device is a battery.

5. An electrical system as recited in claim 4, wherein said power source is an alternator.

6. An electrical system as recited in claim 5, wherein said switching means comprises an electromechanical relay.

7. An electrical system as recited in claim 6, wherein said switching power supply has an output voltage of approximately seven volts.

8. An electrical system for a motor vehicle comprising:
- a switching power supply having a power input and a power output;
- an energy storage device with a power output coupled to said power input of said switching power supply;
- a power source with a power output;
- a plurality of electronic devices each comprising a normal-operation power input and a key-off power input;

wherein said normal-operation power inputs are coupled to said power output of said power source; and wherein said key-off power inputs are coupled to said power output of said switching power supply.

9. An electrical system as recited in claim 8, wherein said coupling of said normal-operation power inputs to said power output of said power source is via an ignition switch.

10. An electrical system as recited in claim 9, wherein:
- at least some of said electronic devices contain keep-alive memory requiring at least periodic power; and
- said switching power supply provides power to said keep-alive memory.

11. An electrical system as recited in claim 10, wherein said switching power supply has an output voltage of five volts.

12. An electrical system as recited in claim 11, wherein said power source is an alternator.

13. An electrical system as recited in claim 12, wherein said energy storage device is a battery.

* * * * *